(12) United States Patent
Kumar et al.

(10) Patent No.: US 11,115,337 B2
(45) Date of Patent: Sep. 7, 2021

(54) NETWORK TRAFFIC SEGREGATION ON AN APPLICATION BASIS IN A VIRTUAL COMPUTING ENVIRONMENT

(71) Applicant: NICIRA, INC., Palo Alto, CA (US)

(72) Inventors: Vasantha Kumar, Pune (IN); Sandeep Kasbe, Pune (IN)

(73) Assignee: Nicira, Inc., Palo Alto, CA (US)

( * ) Notice: Subject to any disclaimer, the term of this patent is extended or adjusted under 35 U.S.C. 154(b) by 119 days.

(21) Appl. No.: 16/429,088

(22) Filed: Jun. 3, 2019

(65) Prior Publication Data

US 2020/0382428 A1 Dec. 3, 2020

(51) Int. Cl.
*H04L 12/851* (2013.01)
*H04L 12/833* (2013.01)
*H04L 12/46* (2006.01)

(52) U.S. Cl.
CPC .............. *H04L 47/24* (2013.01); *H04L 47/31* (2013.01); *H04L 12/4633* (2013.01); *H04L 12/4645* (2013.01)

(58) Field of Classification Search
CPC ..... H04L 47/24; H04L 47/31; H04L 12/4633; H04L 12/4645
See application file for complete search history.

(56) References Cited

U.S. PATENT DOCUMENTS

| 8,612,646 | B2* | 12/2013 | Bartholomay | ..... G06Q 30/0251 710/51 |
| 9,407,504 | B1* | 8/2016 | Di Benedetto | ......... H04L 12/46 |
| 10,505,849 | B1* | 12/2019 | Iny | ......... H04L 47/283 |
| 2013/0287023 | A1* | 10/2013 | Bims | ..... H04L 1/0018 370/389 |
| 2018/0019948 | A1* | 1/2018 | Patwardhan | ........ H04L 47/2475 |
| 2018/0159943 | A1* | 6/2018 | Poon | ........ H04L 67/16 |
| 2020/0213224 | A1* | 7/2020 | Cheng | ..... H04L 49/70 |

* cited by examiner

*Primary Examiner* — Jamal Javaid
*Assistant Examiner* — Ryan C Kavleski

(57) ABSTRACT

The technology disclosed herein enables segregation of network traffic on an application basis. In a particular embodiment, a method is performed in a virtual network interface for a first guest Operating System (OS) executing on a host and includes receiving guest data packets from the first guest OS. The method further includes associating the guest data packets with respective ones of a plurality of applications executing within the first guest OS and separating the guest data packets into respective ones of a plurality of application port interfaces each corresponding to at least one of the plurality of applications. The method also includes passing the guest data packets to a host network interface using the plurality of application port interfaces.

20 Claims, 5 Drawing Sheets

NETWORK TRAFFIC SEGREGATION ON AN APPLICATION BASIS IN A VIRTUAL COMPUTING ENVIRONMENT

TECHNICAL BACKGROUND

Many software applications are now being hosted on computing systems remote from the computing systems from which those software applications will be accessed by a user. Applications executing on remote systems in this manner are now commonly referred to as being cloud based applications. Such cloud based software applications include applications having higher priority than other applications being hosted in the cloud. For example, applications having a business purpose, such as word processing applications, email clients, videoconferencing clients, etc., may have higher priority than other, more consumer oriented, applications, such as social networks, video streaming services, personal video chat services, etc. Similarly, mom latency sensitive applications, such as those using Remote Desktop Protocol (RDP), Virtual Network Computing (VNC), Secure Shell (SSH), and the like, may have higher priority than other applications that are not so latency sensitive applications, such as file sharing applications, video streaming applications, and the like.

The nature of higher priority applications may warrant the implementation of Quality of Service (QoS) policies to prioritize the network traffic exchanged with those applications. Physical network appliances exist to implement some of those policies. The network appliances perform deep packet inspection (DPI) on all network traffic to determine which QoS policy to apply to which packets of the network traffic (e.g., to determine that certain traffic corresponds to a particular application and applying QoS policies for that application to the traffic). The processing resources required to perform DPI, and any other processing of the network traffic by the network appliance, may contribute undue performance overhead and bandwidth reduction to the network through which the network traffic travels. Moreover, the operating cost of such appliances may significantly increase the cost of operating a data center into which the appliances are installed.

SUMMARY

The technology disclosed herein enables segregation of network traffic on an application basis. In a particular embodiment, a method is performed in a virtual network interface for a first guest Operating System (OS) executing on a host and includes receiving guest data packets from the first guest OS. The method further includes associating the guest data packets with respective ones of a plurality of applications executing within the first guest OS and separating the guest data packets into respective ones of a plurality of application port interfaces each corresponding to at least one of the plurality of applications. The method also includes passing the guest data packets to a host network interface using the plurality of application port interfaces.

In some embodiments, the method includes determining one or more respective users associated with the guest data packets. In those embodiments, the respective ones of the plurality of application port interfaces also correspond to the respective users.

In some embodiments, passing the guest data packets to the host network interface comprises implementing one or more Quality of Service (QoS) policies for the guest data packets. In those embodiments, a first QoS policy of the QoS policies may direct the host network interface to use communication bandwidth reserved for data packets of one of the plurality of application port interfaces.

In some embodiments, associating the guest data packets comprises receiving, from a filtering driver of the host, an indication of the respective ones of the plurality of applications associated with each of the guest data packets.

In some embodiments, separating the guest data packets comprises tagging each guest data packet of the guest data packets with a tag indicating an application port interface of the plurality of application port interfaces. In those embodiments, within the host network interface, the method may include encapsulating the guest data packets in respective tunneling packets for transfer from the host and embedding the tag of each guest data packet in each respective tunneling packet. Likewise, in those embodiments, the method may further include routing the tunneling packets through a communication network based on the tags, where one or more Quality of Service (QoS) policies are applied at a destination for the tunneling packets based on the tags. In some cases, routing the tunneling packets through the communication network comprises implementing an Equal Cost Multipath (ECMP) load balancing policy for the guest data packets based on the tags. In the above embodiments, the tunneling packets correspond to one or mom Virtual Extensible Local Area Network (VXLAN) or Geneve tunnels.

In another embodiment, a system is provided having one or more computer readable storage media and a processing system operatively coupled with the one or more computer readable storage media. Program instructions stored on the one or more computer readable storage media, when read and executed by the processing system, direct the processing system to provide a host on which a first guest Operating System (OS) executes. The program instructions further direct the processing system to, in a virtual network interface for the first guest OS, receive guest data packets from the first guest OS and associate the guest data packets with respective ones of a plurality of applications executing within the first guest OS. The program instructions also direct the processing system to separate the guest data packets into respective ones of a plurality of application port interfaces each corresponding to at least one of the plurality of applications and pass the guest data packets to a host network interface using the plurality of application port interfaces.

DETAILED DESCRIPTION

The implementations described herein leverage the nature of virtual computing elements to obviate the need for dedicated physical network appliances that provide QoS for network traffic. In particular, a guest operating system (OS) may be executing on a host in a virtual machine or other type of virtual computing element. Multiple applications may be executing within the guest OS but the network traffic coming from each of those applications is passed from a virtualized network interface used by the guest OS to the host through a single logical port interface. However, rather than simply passing the network traffic to the host through this single logical port interface, the virtualized network interface herein separates the network traffic into a separate port interface depending on the application from which the network traffic originated. As such, QoS policies (or any other type of application dependent handling of network traffic) can be applied within the host based on which port interface is used for which traffic. Network traffic may similarly be separated into various port interfaces depending on a user associated with the traffic (e.g., one use may be prioritized higher than another) or upon some other type of criteria.

Figure 1:
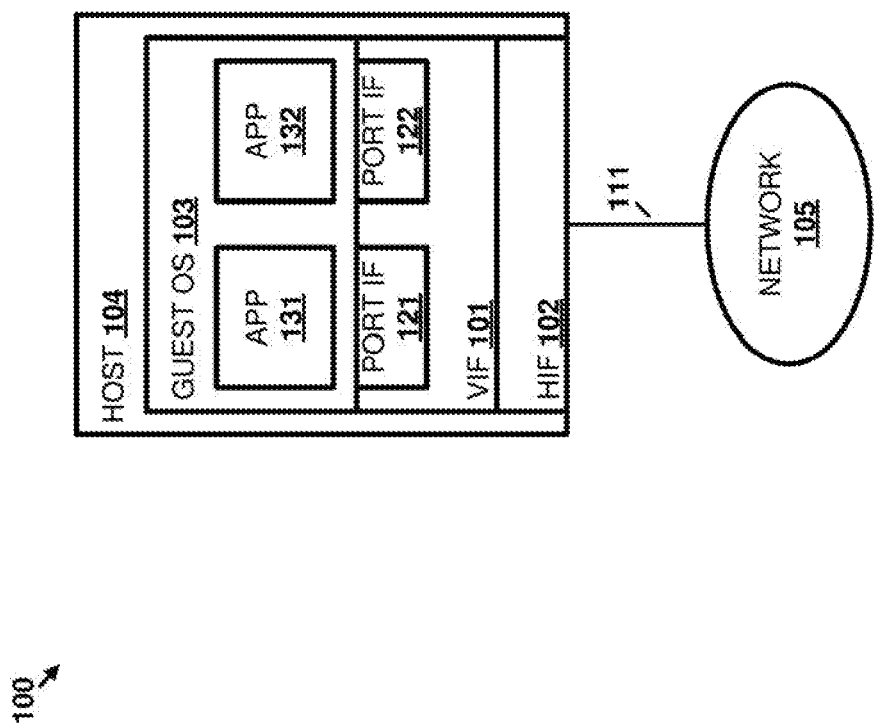
FIG. 1 illustrates an implementation for segregating network traffic on an application specific basis.

FIG. 1 illustrates implementation 100 for processing network traffic using a dynamic chain of service functions. Implementation 100 includes virtual network interface 101, host network interface 102, guest OS 103, host 104, and network 105. Host 104 in this example includes hardware (e.g., microprocessor(s), memory, storage, etc.) and software (e.g., hypervisor) necessary to provide a virtualized computing system (e.g., virtual machine) on which guest OS 103 executes. Host 104 and network 105 communicate over communication link 111, which is a physical link to physical network 105. As such, network 105 may include switches, routers, firewalls, or any other type of networking equipment—including combinations thereof. Similarly, host network interface 102 comprises both the physical network interface of host 104 and any logical interfaces implemented by host 104 (e.g., an endpoint for a logical overlay network, such as a Virtual Extensible Local Area Network (VXLAN) Endpoint (VTEP) or a Geneve tunnel endpoint).

In operation, application 131 and application 132 each provide an application to other systems over network 105. Application 131 and application 132 may perform functions that are prioritized differently based on a QoS for each. For example, application 131 may be of higher priority than application 132. As such, QoS policies may indicate that network traffic for application 131 should be prioritized from guest OS 103 over network traffic for application 132. That is, prioritizing network traffic for application 131 may involve host 104 ensuring the network traffic from application 131 is passed to host network interface 102 for transfer over network 105 before, or at a higher rate, than the network traffic for application 132. Scenario 200 below provides an example of how such QoS policies may be achieved for multiple applications from a single guest OS.

Figure 2:
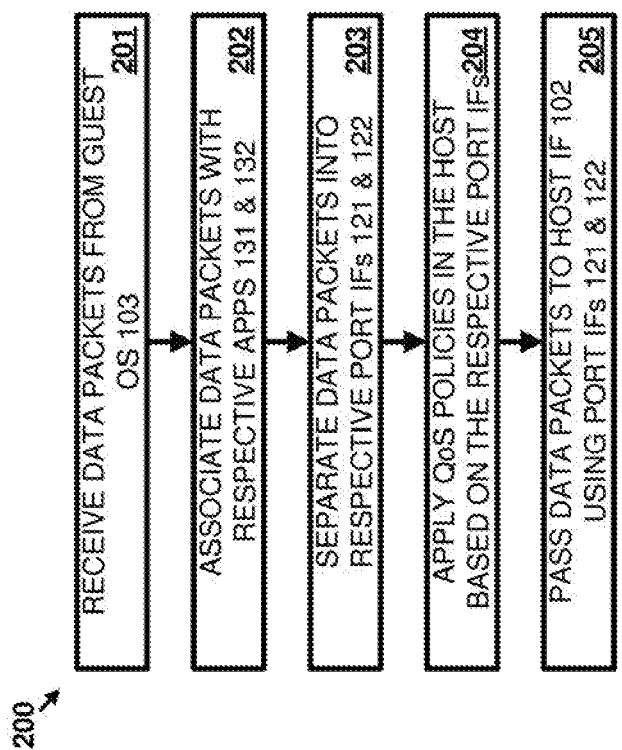
FIG. 2 illustrates a scenario for the implementation to segregate network traffic on an application specific basis.

FIG. 2 illustrates scenario 200 for implementation 100 to segregate network traffic on an application specific basis. In scenario 200, virtual network interface 101 performs the segregation of network traffic packets that virtual network interface 101 receives from guest OS 103. Virtual network interface 101 is an emulation, provided by host 104, of a physical network interface that guest OS 103 would otherwise use if executing directly on physical computing hardware. In one example, virtual network interface 101 is a virtual network interface card (VNIC).

Scenario 200 provides that virtual network interface 101 receives data packets from guest OS 103 (201). However, instead of simply passing those data packets to host 104, virtual network interface 101 associates the guest data packets with respective applications 131 and 132 (202). To determine with which of applications 131 and 132 any one packet is associated, virtual network interface 101 may inspect the packets to identify whether the packets origi- nated from application 131 or application 132. In some cases, an agent may be executing within guest OS 103 that provides application identification information for respective packets to virtual network interface 101. Guest introspection from VMware®, which may be used by a hypervisor to obtain application centric and contextual information about the applications that a guest OS runs, is an example of how an agent executing within guest OS 103 may provide application identification information for the packets. Alternatively, virtual network interface 101 may receive information identifying the application associated with the respective packets from another element of host 104. For instance, host 104 may implement a network filtering driver that inspects the packets from guest OS 103 for the network filtering driver's own purposes (e.g., the network filtering driver may implement a network security function, such as a distributed firewall, within host 104 and may therefore inspect network packets from guest OS 103 to achieve that purpose). When one or more other elements in host 104 are already inspecting packets for their own purposes, the provision of information resulting from those inspections to virtual network interface 101 negligibly increases the computing resources used by host 104.

Scenario 200 then provides that virtual network interface 101 separates the guest data packets into respective ones of application port interfaces 121 and 122 that each correspond to at least one of applications 131 and 132 (203). An application port interface may correspond to specific applications, types of applications (e.g., office productivity, social networking, video streaming, etc.), application vendors, or some other manner in which applications may be categorized—including combinations thereof. In this example, application port interface 121 corresponds to application 131 and application port interface 122 corresponds to application 132. Application port interfaces 121 and 122 effectively creates two logical port interfaces from the logical port interface between virtual network interface 101 and host 104. To sort the packets into their respective ones of application port interfaces 121 and 122, virtual network interface 101 may tag each packet with the application port interface of the packet. However, given that virtual network interface 101 is provided by host 104, virtual network interface 101 may communicate the application port interfaces of the packets to host 104 in some other manner (e.g., in a separate message associated with packets that identifies the application port interface of the packets). It should be understood that, while this example only describes two applications and two application port interfaces, any number of applications and any number application port interfaces may be involved. Similarly, host 104 may host other guest OSs executing applications with equivalent application port interfaces to those of guest OS 103 or different than those of guest OS 103.

Scenario 200 further provides that virtual network interface 101 passes the guest data packets to host network interface 102 using application port interfaces 121 and 122 (204). For example, if virtual network interface 101 tags the packets with their respective application port interfaces, the packets are passed to host network interface 102 through host 104 with those tags. Host 104 can handle how the packets are routed (e.g., through a virtual switch provided by host 104) to host network interface 102 based on the application port interfaces. For example, an administrator may provide host 104 with QoS policies to be applied to packets depending on which application port interface the packets fall into. The QoS policies may therefore prioritize (e.g., allow greater throughput) packets of application port interface 121 over packets of application port interface 122. Since packets are segregated into application port interfaces based on the application from which the packet came, applying QoS policies to the application port interfaces effectively applies the QoS policies to those applications. Other types of policies may also be implemented on the basis of into which application port interface certain packets are segregated.

While the example above segregates packets into application port interfaces based on the application associated with the packets, other characteristics of the packets may be used in addition to, or instead of, the associated application. For instance, an application port interface may correspond to packets for a certain user, a group of users, users associated with a particular business, users in a particular location, or some other characteristic—including combinations thereof. Thus, when the QoS policies are applied to packets of application port interfaces 121 and 122, the QoS policies are effectively applied to packets having one or more of these additional characteristics.

Figure 3:
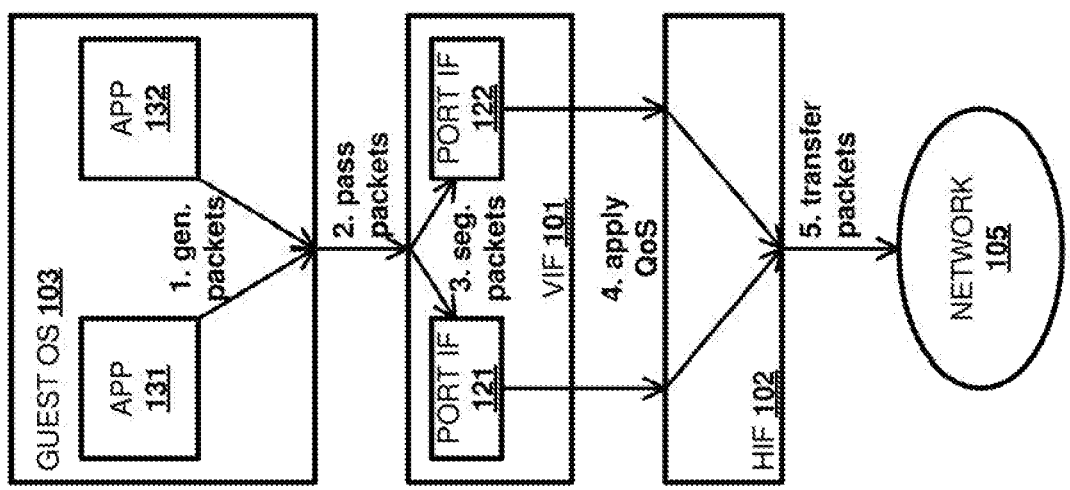
FIG. 3 illustrates another scenario for the implementation to segregate network traffic on an application specific basis.

FIG. 3 illustrates scenario 300 for implementation 100 to segregate network traffic on an application specific basis. Scenario 300 provides a visualization of the flow of data packets through the elements of implementation 100. In particular, applications 131 and 132 both generate packets at step 1 that will eventually be transferred over network 105. In this example, generating the packets in meant to encompass any packets stemming from the respective applications 131 and 132. That is, one of applications 131 and 132 may create the packets or may instead process packets that were created elsewhere and passed to applications 131 and 132. Guest OS 103 passes those packets to virtual network interface 101 at step 2. Upon receiving the packets, virtual network interface 101 segregates the packets into respective application port interfaces 121 and 122 at step 3 based on which of applications 131 and 132 generated the packets. The packets are then transferred to host network interface 102 and QoS policies are applied by host 104 at step 4 during that transfer. Upon receiving the packets, host network interface 102 transfers the packets to network 105 at step 5 for transfer to their respective destinations.

In some examples, the application port interfaces of the respective packets may be maintained between host network interface 102 and their destination(s) over network 105. Tunneling protocols, such as VXLAN or Geneve, may be used to maintain the application port interfaces. When the packets are received by host network interface 102, host network interface 102 may encapsulate the packets in accordance with a tunnel implemented using a tunneling protocol between host network interface 102 and one or more destinations of the packets. Tags indicating each packet's application port interface may then be added to the encapsulation of each packet. Adding tags to the encapsulated packets not only allows the packets' application port interface to be known at each packet's respective destination but, also, allows the application port interface of the packets to be known during routing of the packets over network 105. For example, QoS policies may be implemented for routing packets over network 105 based on each packet's application port interface. Such QoS policies may include reserving bandwidth for packets of certain application port interfaces or implement Equal Cost Multipath (ECMP) load balancing based on the application port interfaces.

Figure 4:
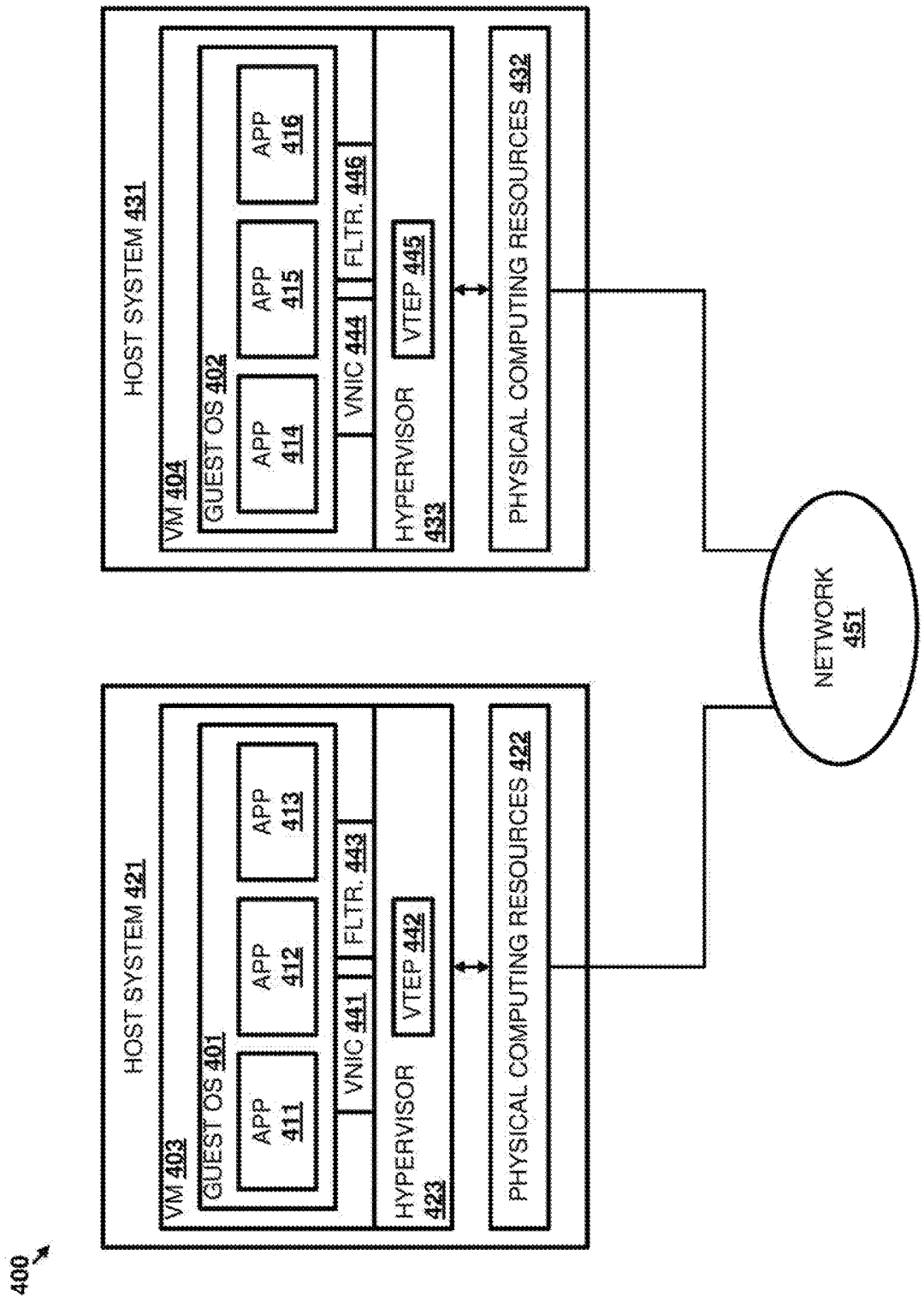
FIG. 4 illustrates another implementation for segregating network traffic on an application specific basis.

FIG. 4 illustrates implementation 400 for segregating network traffic on an application specific basis. Implementation 400 includes host computing system 421, host computing system 431, and network 451. Network 451 may include the Internet, a private micro data center, a mobile edge computing node, one or more local area networks, and/or one or more wide area networks.

In this example, host computing system 421 executes hypervisor 423 to allocate physical computing resources 422 to virtual machine 403 and any other not-illustrated virtual machines hosted by hypervisor 423. Likewise, host computing system 431 executes hypervisor 433 to allocate physical computing resources 432 to virtual machine 404 and any other not-illustrated virtual machines hosted by hypervisor 433. Physical computing resources 422 and 432 may include processing resources (e.g., processing circuitry, CPU time/cores, etc.), memory space (e.g., random access memory, hard disk drive(s), flash memory, etc.), network interfaces, user interfaces, or any other type of resource that a physical computing system may include. Hypervisor 423 includes VTEP 442, which handles communications to and from virtual machines of hypervisor 423 over VXLAN tunnels. Similarly, hypervisor 433 includes VTEP 445, which handles communications to and from virtual machines of hypervisor 433 over VXLAN tunnels. The VXLAN tunnels may be between hypervisor 423 and hypervisor 433 or may connect elsewhere over network 451.

It should be understood that the distribution of one virtual machine per host computing system, as shown in FIG. 4, is merely exemplary. Each of host computing systems 421 and 431 may host multiple virtual machines. Likewise, host computing systems 421 and 431 could host additional hosts (e.g., hypervisors) and/or other virtual elements that are not involved in this example.

Figure 5:
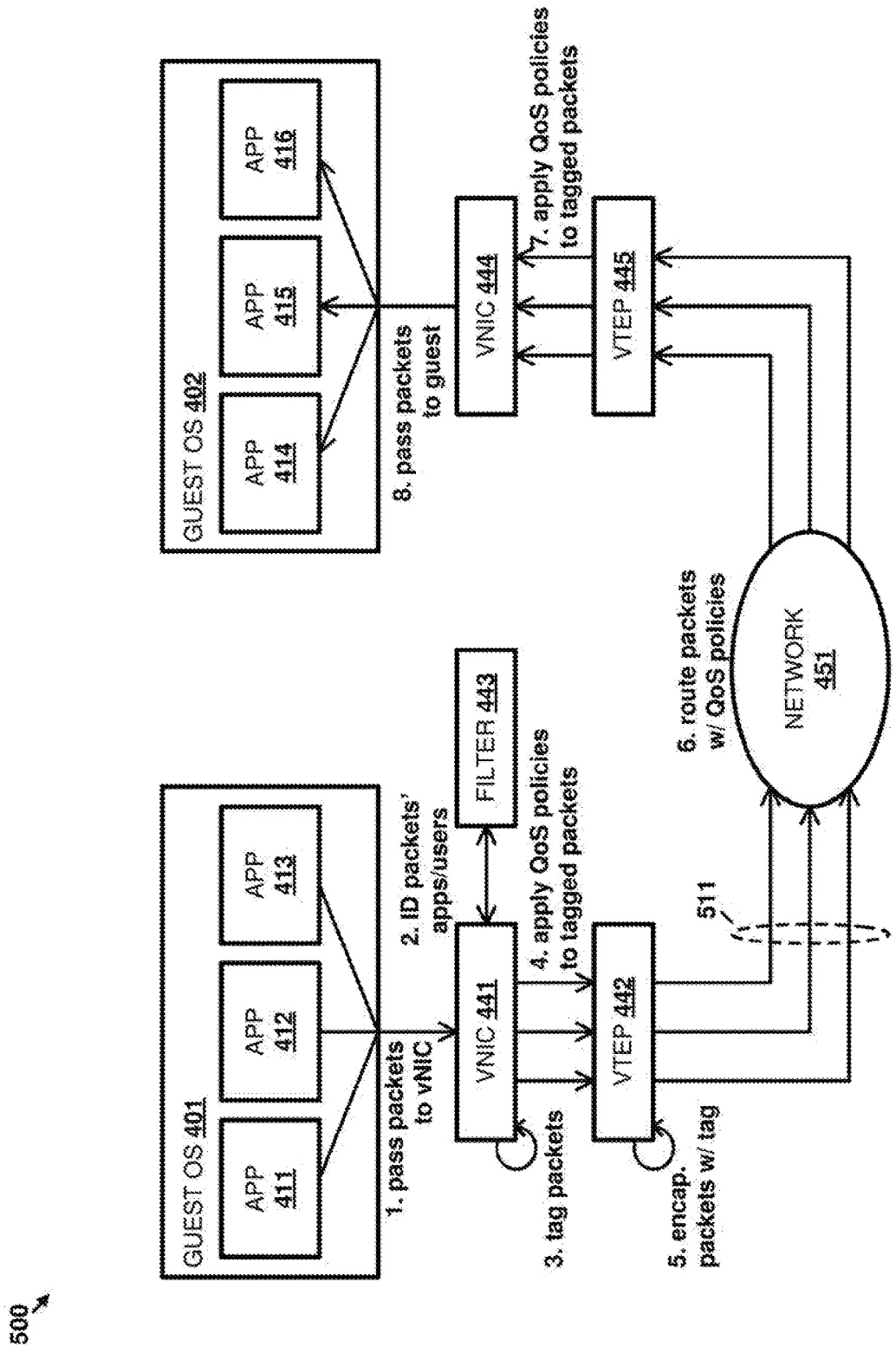
FIG. 5 illustrates a scenario for the other implementation to segregate network traffic on an application specific basis.

FIG. 5 illustrates scenario 500 for implementation 400 to segregate network traffic on an application specific basis. In the example of scenario 500, packets are being transferred from respective ones of applications 411-413 to respective ones of applications 414-416. While packets are being transferred between applications on the same two hosts in this example, it should be understood that packets from applications 411-413 may be transferred to different hosts in other examples. The packets may be transferred between applications 411-416 for any reason. For instance, applications 411-416 may include applications that implement a cloud based application or may implement service functions the operate on packets for various cloud based applications. Regardless, scenario 500 allows QoS policies to be applied on the traffic transferred from applications 411-413 to applications 414-416.

As packets come from each of applications 411-413, the packets are passed by guest OS 401 to VNIC 441 at step 1. VNIC 441 is provided by hypervisor 423 as an emulation of a physical network interface card (PNIC) for virtual machine 403. Filter driver 443 is similarly provided by hypervisor 423 to process packets transferred from guest OS 401. Filter driver 443 may inspect the packets in the performance of its one or more functions. For instance, filter driver 443 may be charged with inspecting the packets to identify and block malicious traffic. During that inspection, filter driver 443 identifies from which of applications 411-413 each packet was transferred and, in some cases, also identifies a user associated with each packet. Filter driver 443 shares the application/user identification information with VNIC 441 at step 2. Responsively, at step 3, VNIC 441 tags each packet with each packet's respective application port interface corresponding to the identification information provided about that packet. In this example, there are three application port interfaces into which the packets are segregated. An administrator may provide VNIC 441 with direction for which packets correspond to which application port interface. At its most basic, a single application port interface corresponds to a single application and/or user, however, more complex rules defining the packets corresponding to application port interfaces may also be used.

After packets are tags with their respective application port interfaces, QoS policies are applied as VNIC 441 passes the packets to VTEP 442 at step 4 based on those application port interfaces. A virtual switch may be implemented by hypervisor 423 to route packets between VNIC 441 and VTEP 442. The packets may be passed through a single logical port, as they would without being tagged, though they can be treated differently under the QoS policies due to their respective tags. The QoS policies may be defined by an administrator and provide instructions as to how packets of each application port interface should be handled. For example, each application port interface may have a designated amount of bandwidth between VNIC 441 and VTEP 442, which allows packets of a higher priority application port interface (e.g., packets associated with higher priority applications, latency sensitive applications, more important users, etc.) to be routed with higher bandwidth than packets of lower priority application port interfaces.

Upon receiving the packets from VNIC 441, VTEP 442 encapsulates the packets at step 5 for transport over VXLAN tunnel 511 to VTEP 445. VTEP 442 maintains the application port interface of each packet by including the application port interface tag of each packet in the encapsulation. Accordingly, QoS policies may further be implemented between VTEP 442 and VTEP 445 at step 6 based on the application port interface of each packet using the tag in the encapsulation. For instance, intervening network elements over which packets are transferred via VXLAN tunnel 511 may be configured to use bandwidth reserved for packets of respective application port interfaces and are able to determine which application port interface corresponds to a packet by reading the tag in the encapsulation. In another example, network 451 may be configured in a leaf-spine topology wherein host computing systems 421 and 431 are included within different racks having leaf switches connected via multiple spine switches. In such an example, ECMP load balancing may be implemented as a QoS policy to distribute the packets across the multiple spine switches by using a source port corresponding to the spine switch through which each packet should be transferred based on that packet's application port interface.

Given that the encapsulated packets maintain the respective application port interfaces over VXLAN tunnel 511 through the use of tags in the encapsulation, VTEP 445 can read the tag in each packet's encapsulation to determine that packet's corresponding application port interface upon receiving the packet and before removing the encapsulation. Accordingly, after removing the encapsulation, VTEP 445 can maintain the application port interface of each packet when the packets are passed to VNIC 444. To do so, VTEP 445 may perform in a similar manner to that described above for VNIC 441 at step 3 to tag the packets with their respective application port interfaces before passing the packets to VNIC 444 at step 7, where QoS policies are applied to the packets based on their respective application port interfaces. The QoS policies may be the same QoS policies applied during step 4 or may be different QoS policies, such as specific QoS policies to packet traffic moving in the VTEP to VNIC direction. As with step 4, a virtual switch may be implemented by hypervisor 433 to pass packets between at least VTEP 445 and VNIC 444. In some examples, the tags originally applied to the packets by VNIC 441 may have propagated along with the packets (e.g., encapsulated along with the packets at step 5) and would not require VTEP 445 to retag the packets after un-encapsulating the packets.

Once received by VNIC 444, the application port interfaces for the packets are no longer relevant. Thus, the packets are passed from VNIC 444 to guest OS 402 at step 8, for distribution to their intended destination applications 414-416, as they would have been passed had the application port interfaces not been implemented before being received by VNIC 444. The tags may be explicitly removed from the packets by VNIC 444, may be stripped inherently when passing packets to guest OS 402, or may remain with the packets for use, or to be ignored, by guest OS 402. Regardless, by leveraging the packet inspection functions already being performed by filter driver 443, VNIC 441 is able to implement QoS policies within host computing system 421, over network 451, and within host computing system 431 without adding appreciable overhead to the packet transmission process. Additionally, while not shown in this example, VNIC 444 may similarly be configured to tag packets coming from guest OS 402 with corresponding application port interfaces based on packet identification information determined by filter driver 446 so that QoS policies can also be applied to packets from applications 414-416.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of segregating traffic on an application specific basis, the method comprising:
   in a virtual network interface included in a virtual machine executing on a host:
      receiving guest data packets from a guest Operating System (OS) executing on the virtual machine;
      associating the guest data packets with respective ones of a plurality of applications executing within the guest OS;
      separating the guest data packets into respective ones of a plurality of application port interfaces each corresponding to at least one of the plurality of applications and included in the virtual network interface; and
      passing the guest data packets from the plurality of application port interfaces to a host network interface included in the host.

2. The method of claim 1, further comprising:
   determining one or more respective users associated with the guest data packets; and
   wherein the respective ones of the plurality of application port interfaces also correspond to the respective users.

3. The method of claim 1, wherein passing the guest data packets to the host network interface comprises:
   implementing one or more Quality of Service (QoS) policies for the guest data packets.

4. The method of claim 3, wherein a first QoS policy of the QoS policies directs the host network interface to use communication bandwidth reserved for data packets of one of the plurality of application port interfaces.

5. The method of claim 1, wherein associating the guest data packets comprises:
receiving, from a filtering driver of the host, an indication of the respective ones of the plurality of applications associated with each of the guest data packets.

6. The method of claim 1, wherein separating the guest data packets comprises:
tagging each guest data packet of the guest data packets with a tag indicating an application port interface of the plurality of application port interfaces.

7. The method of claim 6, further comprising:
in the host network interface, encapsulating the guest data packets in respective tunneling packets for transfer from the host and embedding the tag of each guest data packet in each respective tunneling packet.

8. The method of claim 7, further comprising:
routing the tunneling packets through a communication network based on the tags; and
wherein one or more Quality of Service (QoS) policies are applied at a destination for the tunneling packets based on the tags.

9. The method of claim 8, wherein routing the tunneling packets through the communication network comprises implementing an Equal Cost Multipath (ECMP) load balancing policy for the guest data packets based on the tags.

10. The method of claim 7, wherein the tunneling packets correspond to one or more Virtual Extensible Local Area Network (VXLAN) or Geneve tunnels.

11. A system for segregating traffic on an application specific basis, the system comprising:
one or more computer readable storage media;
a processing system operatively coupled with the one or more computer readable storage media; and
program instructions stored on the one or more computer readable storage media that, when read and executed by the processing system, direct the processing system to:
provide a host on which a virtual machine executing a guest Operating System (OS) executes;
in a virtual network interface included in the virtual machine:
receive guest data packets from the guest OS;
associate the guest data packets with respective ones of a plurality of applications executing within the guest OS;
separate the guest data packets into respective ones of a plurality of application port interfaces each corresponding to at least one of the plurality of applications and included in the virtual network interface; and
pass the guest data packets from the plurality of application port interfaces to a host network interface included in the host.

12. The system of claim 11, wherein the program instructions further direct the processing system to:
determining one or more respective users associated with the guest data packets; and
wherein the respective ones of the plurality of application port interfaces also correspond to the respective users.

13. The system of claim 11, wherein to pass the guest data packets to the host network interface direct the processing system to:
implement one or more Quality of Service (QoS) policies for the guest data packets.

14. The system of claim 13, wherein a first QoS policy of the QoS policies directs the host network interface to use communication bandwidth reserved for data packets of one of the plurality of application port interfaces.

15. The system of claim 11, wherein to associate the guest data packets, the program instructions direct the processing system to:
receive, from a filtering driver of the host, an indication of the respective ones of the plurality of applications associated with each of the guest data packets.

16. The system of claim 11, wherein to separate the guest data packets, the program instructions direct the processing system to:
tag each guest data packet of the guest data packets with a tag indicating an application port interface of the plurality of application port interfaces.

17. The system of claim 16, wherein the program instructions further direct the processing system to:
in the host network interface, encapsulate the guest data packets in respective tunneling packets for transfer from the host and embed the tag of each guest data packet in each respective tunneling packet.

18. The system of claim 17, wherein to pass the guest data packets to the host network interface, the program instructions direct the processing system to:
route the tunneling packets through a communication network based on the tags; and
wherein one or more Quality of Service (QoS) policies are applied at a destination for the tunneling packets based on the tags.

19. The system of claim 18, wherein to route the tunneling packets through the communication network comprises implementing an Equal Cost Multipath (ECMP) load balancing policy for the guest data packets based on the tags.

20. The system of claim 17, wherein the tunneling packets correspond to one or more Virtual Extensible Local Area Network (VXLAN) or Geneve tunnels.

* * * * *